Nov. 23, 1965
H. P. FURTH
3,219,534
PLASMA CONFINEMENT APPARATUS EMPLOYING
A HELICAL MAGNETIC FIELD CONFIGURATION
Filed Oct. 26, 1964
2 Sheets-Sheet 1
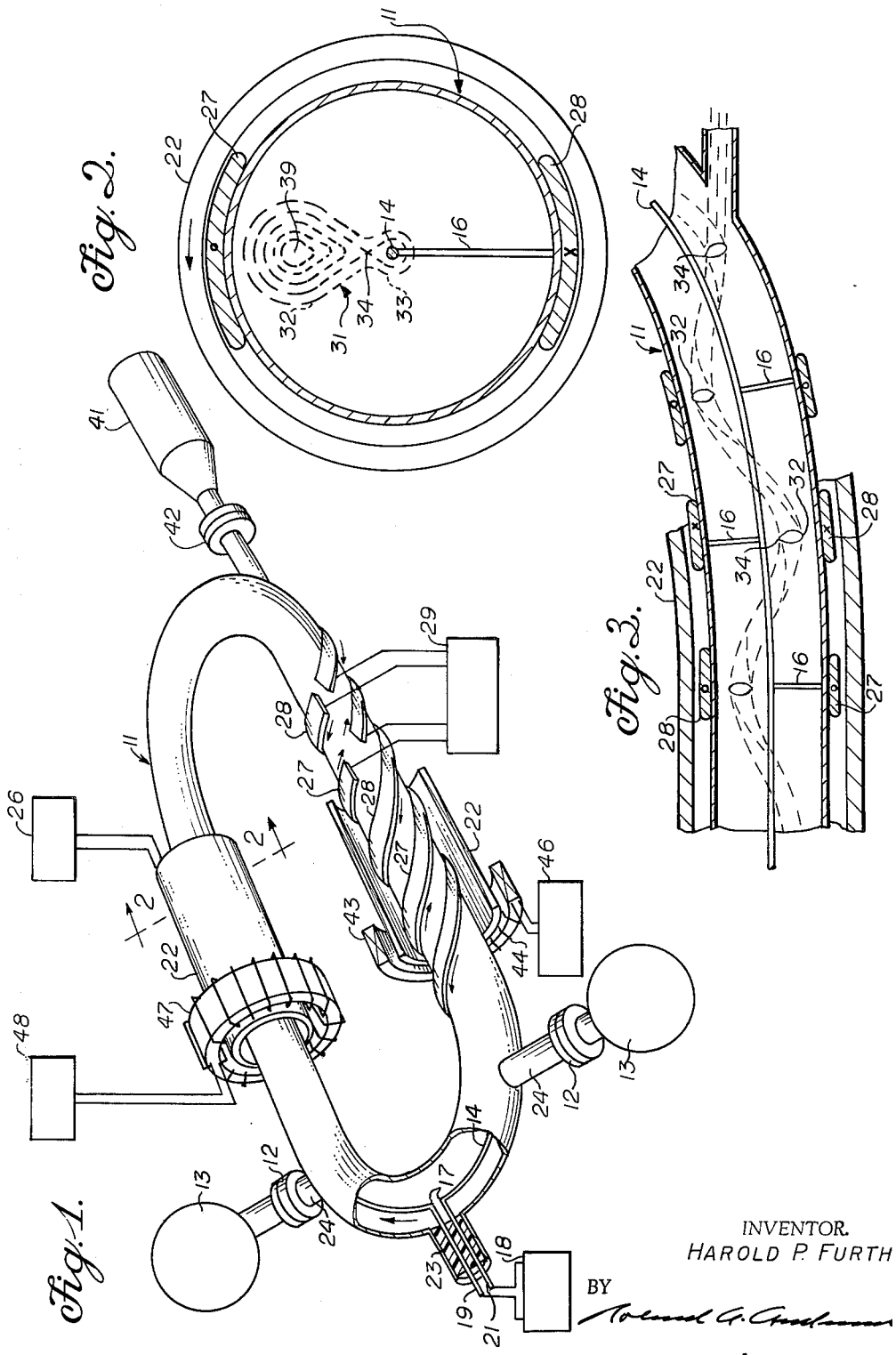
INVENTOR.
HAROLD P. FURTH
BY
ATTORNEY Nov. 23, 1965

H. P. FURTH 3,219,534

PLASMA CONFINEMENT APPARATUS EMPLOYING
A HELICAL MAGNETIC FIELD CONFIGURATION

Filed Oct. 26 1964

INVENTOR.
HAROLD P. FURTH

BY

*Roland A. Anderson*

ATTORNEY

United States Patent Office 3,219,534
Patented Nov. 23, 1965

3,219,534
PLASMA CONFINEMENT APPARATUS EMPLOYING A HELICAL MAGNETIC FIELD CONFIGURATION
Harold P. Furth, Berkeley, Calif., assignor to the United States of America as represented by the United States Atomic Energy Commission
Filed Oct. 26, 1964, Ser. No. 406,639
3 Claims. (Cl. 176—1)

The present invention relates generally to apparatus for establishing and magnetically confining a plasma. More specifically, it appertains to apparatus for establishing a helically non-axially symmetric magnetic confining field characterized by having closed magnetic flux surfaces which define a plasma containment zone having a novel toroidal-like configuration.

Plasmas maintained under stable confinement conditions for extended periods, e.g., a millisecond or longer, are suitable for many purposes. A most notable application of such plasmas is in controlled fusion devices. As has long been known, self-sustaining controlled fusion reactions will take place with a net energy gain in a low pressure plasma when it is maintained under appropriate conditions including stable magnetic confinement whereby an appreciable fraction of the nuclei of the plasma may fuse together. In addition, plasmas are established and maintained under stable confinement conditions in order to undertake reliable quantitative experimental observations on confined plasmas. More recently, low-pressure, high-temperature, magnetically confined plasmas have been employed to pump lasers. The composition of plasmas utilized to pump lasers generally will either include higher atomic number elements with low atomic number elements or be totally composed of higher atomic numbered elements in a partially ionized state to generate line radiation of selected frequencies.

Where it is necessary to establish and maintain a magnetically confined low pressure plasma, it is of paramount importance to do so under hydromagnetically stable equilibrium confinement conditions. It is presently believed that two requirements must be satisfied in order to so confine a plasma. Firstly to satisfy the equilibrium condition it is necessary that the surfaces of constant plasma pressure coincide with magnetic flux surfaces comprised of infinitesimal magnetic flux tubes of constant volume. The second criterion that must be satisfied is the establishment of a magnetic field suitable for the hydromagnetically *stable* confinement of the plasma under equilibrium conditions. As pointed out in the paper, "Stability of Plasmas Confined by Magnetic Fields," by M. N. Rosenbluth and C. L. Longmire, Annals of Physics, vol. 1, pp. 120–140, 1957, a plasma will be magnetically confined in a hydromagnetically stable state of equilibrium if the plasma is confined within nested magnetic flux surfaces characterized by surfaces comprised of infinitesimal magnetic flux tubes having larger volumes per unit flux being encircled by surfaces comprised of infinitesimal magnetic flux tubes having smaller volumes per unit flux.

A plasma confined by a magnetic field which fulfills the requirements set forth supra will be hydromagnetically stably confined since any forces tending to cause the plasma to be displaced across the magnetic field lines will be offset by a "restoring force" which opposes such movement of the plasma. This "restoring force" exists since, in order for a plasma to be displaced towards a magnetic field region wherein the magnetic flux tubes have smaller volumes per unit flux, the plasma would have to be compressed, thereby raising its energy, i.e., the plasma is disposed in a "potential well." For such displacements to take place in any sizeable manner, it would have to occur in violation to the principle of the conservation of energy. Therefore, such gross plasma displacements characteristic of hydromagnetic instabilities, which generally lead to the destruction of the plasma by escape to the material walls of the container, will be prevented.

With the plasma confinement apparatus of the present invention, a plasma is established and magnetically confined in a closed toroidal-like configuration under hydromagnetically stable equilibrium conditions. More specifically in accordance with the present invention a plasma fuel gas is introduced into an evacuated toroid-like container. Where the apparatus of the present invention is operated to produce power, the plasma fuel gas is preferably selected from the group of the light elements consisting of hydrogen isotopes of atomic weight greater than one, helium three, and lithium. However for other applications, e.g., the pumping of lasers, the plasma fuel gas could be composed of any of the known elements and mixtures thereof.

Towards confining the plasma fuel gas away from the container walls, a helically non-axially symmetric magnetic field having closed nested magnetic flux surfaces each forming a toroidal-like tube is established within the tubular container. The resultant magnetic field is best described by the following equations definitive of its principal component parts:

(1)  $B_\theta = B_{z0} k [-R_c \cos(\theta + kz) + A/r]$ (2)  $B_r = -B_{z0} R_c k \sin(\theta + kz)$ (3)  $B_z = B_{z0} [1 - R_c k^2 r \cos(\theta + kz)]$ where $B_\theta$ is the azimuthal component of the magnetic field in gauss, $B_r$ is the transverse component of the magnetic field in gauss, $B_z$ is the axial component of the magnetic field in gauss, $B_{z0}$ is the magnitude of the axial magnetic field component along the axis of the helix in gauss, $\theta$ is the azimuthal coordinate of the magnetic field relative to the axis of the helix in radians, $r$ is the radial coordinate of the magnetic field relative to the axis of the helix in centimeters, $z$ is the magnetic field coordinate taken along the axis of the helix in centimeters, $k$ is equal to $2\pi$ divided by the period of the helix, T, in centimeters, $R_c$ is equal to the radial distance of a magnetic field line measured from the axis of the helix which revolves thereabout at a constant radius in the absence of the azimuthal field in centimeters, and $A$ is a scale factor constant relating the azimuthal and axial magnetic field components in units of centimeters squared.

The transverse section of the magnetic field lines described by Equations 1–3 is a non-symmetrical figure-eight-like configuration of closed flux surfaces of constant volume flux tubes which define major and minor lobe regions, with the flux surfaces of the minor lobe region surrounding the axis of the helix. The lobe regions are disjointed at a point along a line symmetrically bisecting the figure-eight-like flux surface cross section, i.e., the line locus of the crossover points of the figure eight configuration is a stagnation axis. This point is designated as the "stagnation point" and it corresponds to a point lying just without the close flux surface of minimum volume per unit flux. This flux surface of minimum volume per unit flux lies within the major lobe region and surrounds nested closed flux surfaces of constant larger volumes per unit flux; closed flux surfaces of larger volumes per unit flux encircled by flux surfaces of smaller volumes per unit flux. In each transverse section, maximum volume per unit flux line exists at a *point* which is encircled by the flux surfaces of smaller constant volume per unit flux and is defined by the equation (4) $$R_m = \frac{R_c + \sqrt{R_c^2 - 4A}}{2}$$

where $R_m$ is the radial distance in centimeters taken from the axis of the helix.

As the magnetic field lines helically advance in the direction of the axis of the helix, the field lines comprising each closed flux surface encircling the magnetic field line of maximum volume per unit flux monotonically advance, in serial order, along the path defined by the closed flux surfaces. Therefore, the distance from the axis of the helix of a given magnetic field line defining a closed flux surface varies periodically between a minimum and a maximum as the line advances along the axis. The path of each field line comprising the closed magnetic flux surfaces defines a helix of a continuously and periodically varying diameter as it progresses along the axis of the helix. It is noted, however, that since the maximum volume per unit flux exists at a point, i.e., $R_m$, as the magnetic field line coincident thereat helically advances along the axis of the helix, its distance from the axis remains constant. Therefore, the diameter of the helix formed thereby is constant.

The period of revolution of a magnetic field line about the entire closed flux surface varies from being substantially equal to the period of the helical advance for lines definitive of the flux surface nearest the maximum volume per unit flux point to infinity for the magnetic field line coincident with the locus of the "stagnation point," i.e., the magnetic field line which helically advances along the axis of the helix at a constant distance, $R_s$, therefrom. Since the magnetic field line definitive of the constant diameter helix has a fixed radial coordinate, its path is termed the "stagnation line." Accordingly, the point whose locus is the "stagnation axis or line" is termed the "stagnation point."

As noted supra, the axis of the helix is coincident with the minor lobe region. Furthermore, as set forth supra, the distance of closest approach to that axis by any magnetic field line defining the major lobe region is greater than the distance from the axis to the "stagnation line." Therefore as the magnetic field lines helically advance in the direction of the axis of the helix, the major lobe region will rotate about the axis whereby it will at all times be on the side of the locus of the "stagnation point" distal the minor lobe region. Hence, the major lobe region will never embrace the axis of the helix. In addition, the direction of rotation of the major lobe region about the axis of the helix is exactly contra to the direction of advance of the magnetic field lines along the path defined by closed flux surfaces.

The aforedescribed magnetic field is established by appropriately energizing three coils suitably disposed relative to each other. More particularly, a solenoidal coil is wound to form a torus with the turns of the coil being wound at right angles to the axis. The coil is energized to establish an axial magnetic field of a magnitude $B_{zo}$. A ring shaped center conductor is supported to be coaxial with the solenoidal coil and is energized by current directed therethrough in the direction of the axial field to establish an azimuthal magnetic field. For a given axial magnetic field, $B_{zo}$, the center conductor current, $I\theta$, in amperes, is defined by the equation (5) $$I_\theta = 10 \left( \frac{B_{zo} k A}{2} \right)$$

where the parameter A is defined by the inequality expression (6) $$R_w(R_c - R_w) < A < \frac{R_c^2}{4}$$

where $R_w$ is the radius in centimeters of the center conductor, and the parameter $k$ is defined by the inequality expression (7) $$\frac{1}{\left(T_T + \frac{L}{\pi}\right)} < k < \frac{0.4}{R_c}$$

where

L is the length in centimeters of any straight section of the toroidal-like magnetic field configuration, and
$R_T$ is the radius of the curved section of the field taken along the locus of the point defining the axis of the helix.

In those cases where the magnetic field does not include any straight sections, Equation 7 reduces to (8) $$\frac{1}{R_T} < k < \frac{0.4}{R_c}$$

The curving of the magnetic field lines to form a toroidal-like magnetic field configuration tends to adversely affect the stability characteristic of the magnetic field. Therefore, to insure that the magnetic field will stably confine a plasma (9) $$R_T > 2.5 R_c$$

However, to insure that the magnetic field is far into the stable criterion range, it is preferred that

(10) $$R_T > 10 R_c$$

The third coil is composed of two parallelly wound helical coils forming a toroidal-like configuration supported in coaxial relation with the center conductor. The wires comprising the coils are of elongated cross section with the longer side lying in a plane coaxially aligned with the center conductor. The helical coils are energized by current directed in opposite direction through the coils whereby the current flows in opposite directions through adjacent wires and thereby establishes a magnetic field which is transverse to the axis of the helix and whose vector direction rotates thereabout progressively along the axis. The pitch of the helical coils is adjusted to satisfy the inequality expression

(11) $$2.5 R_c - \frac{L}{\pi} \leq R_T$$

and where the magnetic field is without straight portions L goes to zero.

The interaction of the magnetic field established by the center conductor and that of the helix is such that the major lobe region always lies between and symmetrical about a line joining the centers of the center conductor and helical conductor carrying current having a vector component parallel to the center conductor current vector. The cancelling effect of the resulting opposing magnetic fields establishes the "stagnation point" and hence "line" at radial distance, $R_s$, in centimeters from the axis of the helix defined by the equation

(12) $$R_s = R_c - R_m$$

By winding the helical coils to satisfy the inequality of Equation 11, the requirement for stable confinement of a plasma will be assured in a toroidal-like magnetic field configuration whose curved regions have a radius of curvature defined by Equation 9.

For a given axial magnetic field, $B_{zo}$, the current $I_H$, in amperes directed through each of the helical coils is defined by the equation $$(13) \qquad I_H \approx 10\left(\frac{kR_cB_{zo}}{2\pi d}\right)$$

where $d$ is the width of the elongated conductor forming the helical coil windings in centimeters.

In the establishment of the plasma, the plasma fuel ions may be ionized and raised to the appropriate kinetic temperature in several ways. The various ways of forming and heating a plasma as relevant to the present subject has been extensively discussed in various publications, e.g., "Controlled Thermonuclear Reactions," by Samuel Glasstone and Ralph H. Lovberg, D. Van Nostrand Co., Inc., New York (1960), chapter 5. For example, atomically neutral plasma fuel gas, introduced into the evacuated container through an appropriate inlet port, could be initially ionized in the presence of the afore described magnetic field by radiofrequency breakdown techniques. Subsequent to the initial ionization of plasma fuel gas, the kinetic temperature of the plasma could be raised by ohmic heating techniques.

To sustain operations over a long period of time, or even to aid in the plasma build-up process, additional plasma fuel gas may be introduced into the container as the apparatus is being operated.

As will become apparent hereinafter, having once provided the apparatus for establishing a magnetic field capable of confining a plasma under stable equilibrium conditions, numerous modifications of and additions to the apparatus in accordance with the present invention become apparent as the plasma is considered for various applications.

Thus, it is seen that a primary object of this invention is to provide apparatus capable of establishing a magnetic field which will confine a plasma under stable equilibrium conditions.

More particularly, it is an object of this invention to provide stable equilibrium confinement of a plasma in a closed toroidal-like magnetic field configuration whereby end-losses characteristic of open-end magnetic field configurations are averted.

It is another object of this invention to provide a closed toroidal-like helical magnetic field configuration including a region suitable for plasma confinement which is at all times radially displaced from the helical axis thereby allowing free access thereto.

It is still another object of this invention to provide apparatus for producing and magnetically confining a high temperature low pressure plasma under conditions suitable for the promotion of controlled fusion reactions.

These and other objects and advantages of the present invention will become more apparent when the following detailed description is considered together with the accompanying drawings, in which:

FIGURE 1 is a diagrammatic illustration of a preferred embodiment of the apparatus for producing and confining a plasma in accordance with the present invention;

FIGURE 2 is a cross sectional view of the apparatus of FIGURE 1 taken along line 2—2;

FIGURE 3 is an enlarged cut-away of a section of FIGURE 1 illustrating the helical configuration of the magnetic field defining the plasma confinement zone;

Figure 6:
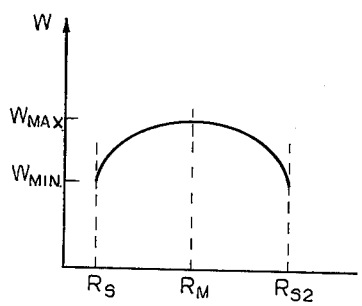
Figure 5:
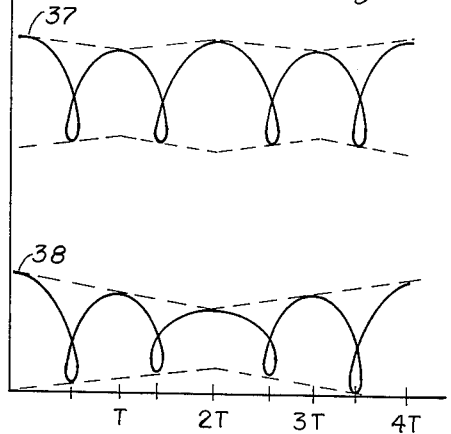
Figure 7:
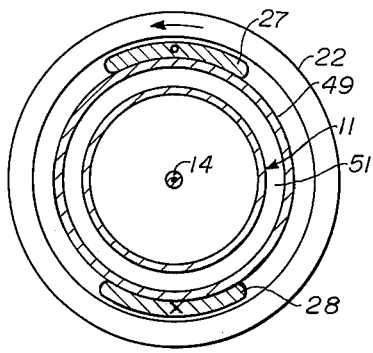

FIGURE 5 comprises graphical illustrations demonstrating the different manner in which magnetic field lines lying on different flux surfaces helically advance along the principal axis of the container with portion (a) illustrative of the case where the magnetic field line lies on a closed flux surface nearest the point of maximum volume per unit flux and portion (b) illustrative of the case where the magnetic field line lies on a closed flux surface of a volume per unit flux smaller than maximum;

FIGURE 6 is the graphical representation of the variance of the volume per unit flux through major lobe region taken along a line extended from the helical axis through the "stagnation point"; and FIGURE 7 is a cross sectional view of apparatus for producing and confining a plasma, such as illustrated in FIGURE 1, adapted to include means for extracting from the plasma energy generated by fusion reactions that occur therein;

With reference to FIGURES 1 and 2, an evacuated plasma containment space is provided by a housing defining a toroidal-like chamber 11, the cross section of chamber 11 preferably circular as shown in FIGURE 2. The radius of curvature, $R_T$, of the curved sections of chamber 11 must be greater than 2.5 $R_c$ and preferably 10 $R_c$. Chamber 11 is provided with a plurality of ports 12 (two shown) hermetically disposed thereabout to communicate suitable ultra-high vacuum pumping means 13 thereto in order to remove extraneous atmospheres therefrom. Vacuum pumping means 13 may be selected from any of the well known conventional vacuum pumping systems such as diffusion and gettering vacuum pumps. The vacuum pumping means 13 is operated to establish a vacuum of at least $10^{-4}$ mm. Hg.

A ring-shaped center conductor 14 is coaxially disposed within chamber 11 and supported by nonmagnetic-insulating structure members 16. The center conductor 14 is divided at center conductor section 17 to afford the terminal means to supply energizing current thereto from power source 18. The energizing current is delivered to center conductor 14 via conductor extensions 19 and 21 of conductor 14. Extensions 19 and 21 hermetically transpierce chamber 11 to electrically connect power source 18 to conductor 14. Where chamber 11 is constructed from non-magnetic metallic material, conductor extensions 19 and 21 must be insulated from chamber 11 as they penetrate therethrough. Upon the energization of conductor 14 an azimuthal magnetic field is established.

Towards providing an axial magnetic field, a solenoidal coil 22 is wound coaxially about the entire circumference of chamber 11 to form a torus with the turns of coil 22 being wound at substantially right angles to the minor axis of chamber 11. To allow for the communication of power supply 18 with conductor 14, a tube 23 insulatingly passes through coil 22. Also tubes 24 insulatingly pass through coil 22 to provide communication between vacuum pump 13 and chamber 11. Coil 22 is electrically connected to a second power source 26 which supplies the required energizing current to coil 22 to establish a magnetic field in the same direction as the current flow direction in center conductor 14.

A magnetic field transverse to the minor axis of chamber 11 is established parallelly winding first and second coils 27 and 28 respectively helically about chamber 11 to form an annular configuration supported in coaxial relation with chamber 11. The windings of coils 27 and 28 are arranged about chamber 11 so that a turn of coil 27 is always diametrically opposed by a turn of coil 28. (Refer to FIGURE 2.) The wires comprising coils 27 and 28 are of elongated cross section spacially oriented to have one of the longer sides juxtaposed the walls of chamber 11. Preferably, the helical coils 27 and 28 are interposed and supported insulatingly apart chamber 11 and coil 22. However, where chamber 11 is constructed from insulating material, such as glass, the helical coils 27 and 28 may be wound thereon.

Helical coils 27 and 28 are electrically connected to a third power source 29. Source 29 directs current through coil 27 in a flow direction opposite that of coil 28. The current flow directions are illustrated by arrows in FIGURE 1 and by arrow points and shafts in FIGURES 2 and 3. The pitch of the helical coil windings is selected in accordance with Equation 11. For example, for a given magnetic field strength established in accordance with the present invention having no straight sections and whose axis of the helix has a radius of curvature $R_T$ of 100 centimeters, the pitch of the helical windings should be less than $628/N$ where N is the number of complete turns of the helical winding.

To afford the means of communicating the helical coils 27 and 28 with source 29, a passageway through solenoidal coil 22 is provided by tubes in the same manner noted hereinbefore relative to center conductor 14.

Figure 4:
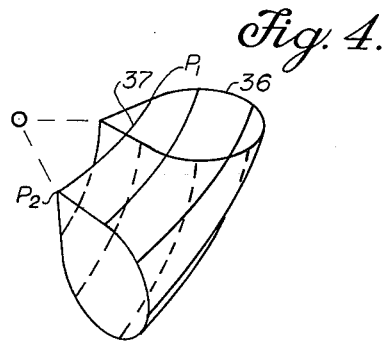
FIGURE 4 is a graphical illustration demonstrating the manner in which the magnetic field lines helically advance along the principal axis of the container.

With reference to FIGURES 2, 3 and 4, for a desired axial magnetic field intensity $B_{zo}$, a given radius of center conductor 14, a given width of the elongated helical conductors, and a desired flatness and helical pitch, the necessary center conductor current is determined from Equations 5, 6 and 7 or 8. Additionally, the necessary helical conductor current is determined from Equation 13.

With particular reference to FIGURE 2, upon the energization of the coils 14, 22, 27 and 28 in accordance with previously set forth conditions to establish a magnetic field of a selected strength, a magnetic field configuration is established whose transverse section is a figure-eight configuration of closed nested flux surfaces 31 of constant volume flux tubes. The nested flux surfaces define a major lobe region 32 and minor lobe region 33 separated by a "stagnation point" 34. Turning now to FIGURE 3, it is seen that as the magnetic field lines helically progress along the axis of the helix, the major lobe region 32 helically advances along the axis in manner whereby it will at all times be on the side of the locus of "stagnation point" 34, i.e., "stagnation line," distal the center conductor 14. Consequently, the minor lobe region 33 will embrace the center conductor 14.

As noted hereinbefore, major lobe region 32 will always be symmetrical about a line joining the centers of conductor 14 and the helical coil, coil 27 as shown in the figures, carrying current having a vector component parallel to the center conductor current vector. Therefore, the transverse section of the magnetic field lines must helically progress along the principal axis of chamber 11 at the same pitch as helical coils 27 and 28.

Attention is now directed to FIGURE 4. As was explained hereinbefore, as the magnetic field lines helically progress in the direction of minor axis of chamber 11, they simultaneously advance monotonically, in order, about their respective closed flux surfaces of constant volume per unit flux to have a direction of rotation thereabout exactly contra to the direction of rotation of the lobe regions about the axis of the helix. Considering the single flux surface 36 is FIGURE 4, it is seen that as it advances helically in the clockwise direction, each magnetic field line on the surface 36, e.g., magnetic field line 37, advances counter clockwise from a first station $P_1$ on flux 36 to a second station $P_2$.

As was noted hereinbefore, the period of rotation of a magnetic field line about its flux surface varies from a minimum to a maximum, with those constituting the flux surfaces of larger constant volumes per unit flux having smaller periods than those of larger constant volumes per unit flux. With particular reference to FIGURE 5, it is seen that this rotation of magnetic field lines about a closed flux surface causes the diameter of the helix formed by the magnetic field lines to periodically vary. Magnetic field line 37 represents a field line from a flux surface closest to the maximum constant volume per unit flux surface while magnetic field line 38 represents a field line from a flux surface nearest to the minimum constant volume flux surface.

Referring now to FIGURES 2 and 6, it is seen that the variation in the volume per unit flux, W, across the major lobe region 32 along a line connecting the centers of center conductor 14 and the conductor of helical conductor 27 is symmetrical about the maximum volume per unit flux point 39 which is at a radial distance $R_m$ from the principal axis of chamber 11. Therefore, any line through point 39 connecting points on a given closed flux surface defines a symmetrical variation in W therealong. The closed flux surface of minimum volume per unit flux is closest to the minor axis of chamber 11 at a radial distance $R_s$ and furthest therefrom at a radial distance $R_{s2}$, with $R_m - R_s$ equal to $R_{s2} - R_m$.

Referring again to FIGURES 1 and 3, a plasma fuel gas source 41 introduces plasma fuel gas into chamber 11 via an inlet port 42 of chamber 11. Inlet port 42 is insulated from coil windings surrounding chamber 11 as it passes through the windings. Towards the establishment of a magnetically confined plasma, a cold plasma fuel gas may be introduced into chamber 11 and subsequently ionized and heated to the desired kinetic temperature. Alternatively, the residual atmosphere present in chamber 11 may be ionized and heated, and then energetic plasma fuel gas subsequently injected into chamber 11. Where plasma fuel gas is injected subsequent to the initial ionization of the residual gas (or where it is desired to inject additional plasma fuel gas during operation after the formation of the plasma) it is preferred for most efficient operation to inject the fuel gas into the major lobe region 32, since it is in this region where the plasma will be magnetically confined under stable equilibrium conditions. Therefore the probability for trapping of injected fuel gas particles is greatest in this region.

Plasma fuel source 41 may be selected from any of the well known types e.g., neutral atom injector. In such case, plasma fuel source 41 will include a conventional high energy ion source and neutralizer. One such neutral atom injector is described in application Serial Number 200,586 of Charles C. Damm, filed June 6, 1962, now Patent 3,152,959, entitled Injection Method and Apparatus for Controlled Fusion Devices.

Referring now to FIGURE 1, the initial ionization, when required, of the plasma fuel gas particles is accomplished by, for example, coaxially supporting a ferrite core inductor 43 about chamber 11. The coil windings 44 of inductor 43 are electrically connected to be energized by an RF source 46. RF source 46 supplies a voltage of the order of 100 volts at a frequency in the range of 100 kilocycles to a few megacycles to the gas in the chamber.

After the plasma fuel gas particles have been ionized, they are heated to the desired kinetic temperature by employing any of the well known plasma heating techniques, e.g., ohmic heating. For example, as shown in FIGURE 1, an iron core "Rowland" ring type coil 47 is supported about chamber 11 whereby the minor axis of the torus of the "Rowland" ring coil 47 is coaxial with the minor axis of chamber 11. The windings of the coil 47 are electrically connected to be energized by a suitable current pulse source 48. Current is directed through winding in coil 47 so that the current flow induced in the plasma is substantially parallel to the magnetic field lines. To heat a deuterium plasma having an electron density of $10^{14}$ electrons per $cm.^3$ to an energy equivalent temperature of 300 electron volts, a pulse of current approximately one millisecond in duration is required. It should be noted that when the apparatus of the present invention is operated under conditions appropriate for fusion reactions to take place, the high temperature plasma would provide the means for heating injected cold gas particles. Hence, the ohmic heating step would be unnecessary.

When the apparatus of the present invention is operated under conditions suitable for sustained thermonuclear fusion reactions to occur, energy is radiated by the plasma, for example, in the form of neutrons. Hence, to operate the apparatus as a power generator it is necessary to provide means to capture this energy. With reference to FIGURE 7, a second housing defining a toroidal-like chamber 49, likewise pervious to a magnetic field, is interposed the helical coils (27 and 28) and chamber 11 to coaxially surround chamber 11 to define a liquid flow channel 51 between chambers 11 and 49. A medium, such as heavy water, suitable for slowing down energetic nuclear particles from the plasma and hence absorb the energy carried thereby, is circulated by a suitable liquid circulating pump (not shown) to flow through channel 51 to a suitable heat exchanger (also not shown). The energetic nuclear particles radiated by the plasma as a result of reactions occurring in chamber 11 pass through the medium circulated through channel 51. The medium absorbs the energy of the particles and transforms it into heat in the medium. The heated medium is circulated through the heat exchanger where it gives up its energy to a heat engine or secondary heat transfer agent.

It should be noted that where the apparatus is operated as a fusion reactor, it is generally necessary to provide large magnetic fields, e.g., 20,000 gauss, to confine the resulting high temperature plasma. In such cases coils generating the magnetic field must carry very large currents. Hence, it is appropriate to provide some conventional means to cool the current carrying material. One such way to cool the material is to provide hollow current carrying conductors and circulate therethrough a suitable coolant, e.g., fluids or a cryogenic coolant such as liquid air, hydrogen or nitrogen.

A particular example of preferred parameters for establishing a magnetic field configuration for confining a plasma in accordance with the present invention is as follows:

Chamber 11 a toroid having:
| | |
|---|---|
| A major radius, $R_T$ | 5 m. |
| A minor radius | 1 m. |
| $R_c$ | 0.5 m. |
| L | 0.0 m. |
| $R_w$ | 5 cm. |
| d | 2 m. |
| $B_{zo}$ | 20 kilogauss. |
| T | $5\pi$ m. |
| A | 0.08 m.² |
| k | 0.4 m⁻¹. |
| $I_\theta$ | 3200 amperes. |
| $I_H$ | 3500 amperes. |
| Plasma fuel | Deuterium. Deuterium-tritium mixture. |
| Plasma density | $10^{12}$ to $10^{16}$ particles/cc. |
| Ion kinetic temperature | 5 kev to 100 kev |

While the present invention has been hereinbefore described in detail with respect to a single embodiment it will be apparent that numerous modifications and variations are possible within the scope of the invention. For example, the period of the helical advance of the helican coils can be varied along the axis of the helix within limits set forth that define the stability criterion. The housing that defines the evacuated chamber 11 can be made to encircle the coils that establish the transverse and axial magnetic field components.

Hence the description of the present invention with respect to the embodiment shown is not intended to limit the invention except by the terms of the following claims.

What is claimed is:
1. In apparatus for magnetically confining a plasma under stable equilibrium conditions, the combination comprising,
   (a) solenoidal coil means wound in the form of a toroid for establishing in an evacuated space a magnetic field component extending longitudinally through the tube defined by the toroid, the windings of said solenoidal coil substantially at right angles to the minor axis of said toroid,
   (b) a center conductor means supported insulatingly from and coaxially with said solenoidal for establishing in said evacuated space an azimuthal magnetic field component about said minor axis of said toroid, said center conductor energized by current directed in the same direction of the longitudinal magnetic field lines, and
   (c) two parallel wound diametrically opposed helical coils supported insulatingly from and helically coaxial with said solenoidal, the wire forming said coils of elongated cross section, said coils adapted to be energized by oppositely flowing current to establish in said evacuated space a transverse helically rotating magnetic field component whereby mutual interaction of said magnetic field components produce a resultant magnetic field defining a bilobular helical confinement zone for charged particles.

2. Apparatus for magnetically confining a plasma as recited in claim 1 further defined by
   (a) an evacuated toroidal magnetically pervious housing having a circular cross section in the plane of the minor axis of said torus, the mean circumference of said torus equal to integral multiples of the pitch of said helical windings,
   (b) said solenoidal coil disposed coaxially about said housing, and
   (c) said helical coils interposed said housing and said solenoidal coil.

3. In apparatus for magnetically confining a plasma under stable equilibrium conditions, the combination comprising
   (a) an evacuated toroidal magnetically pervious housing having a circular cross section in the plane of the minor axis of said torus,
   (b) a solenoidal coil wound coaxially about and insulated from said housing for establishing upon its energization a magnetic field component, $B_{zo}$, extending longitudinally through the evacuated region defined by said housing, the windings of said solenoidal coil substantially at right angles to the minor axis of said toroid,
   (c) terminal means for electrically connecting said solenoidal coil to a current source,
   (d) a center conductor supported insulatingly from and coaxially within said housing for establishing upon its energization an azimuthal magnetic field component about the minor axis of said torus,
   (e) terminal means for electrically connecting said center conductor to a current source to provide current flow through said conductor in the direction of the magnetic field lines established by said solenoidal coil, the magnitude of said current, $I\theta$, in amperes defined by the equation $$I_\theta = 10\left(\frac{B_{zo}kA}{2}\right)$$

where the parameter A is defined by the inequality expression $$R_w(R_c - R_w) < A < \frac{R_c^2}{4}$$

and where $R_w$ is the radius in centimeters of the center conductor, and $R_c$ is equal to the radial distance in centimeters of a magnetic field line measured from the minor axis of the torus which revolves thereabout at a constant radius in the absence of the azimuthal field, (f) two parallelly wound diametrically helical coils interposed insulatingly from and coaxially with said solenoidal coil and housing, the wire forming said coils of elongated cross section, said coils adapted to be energized by oppositely flowing current to establish in said evacuated region defined by said housing a transverse helically rotating magnetic field component, the magnitude of said current, $I_H$, in amperes defined by the equation $$I_H = 10 \frac{k R_c B_{zo}}{2\pi d}$$

where $d$ is the length in centimeters of the elongation of said wire of said helical coil, and (g) means for introducing plasma fuel gas into said housing.

References Cited by the Examiner

UNITED STATES PATENTS

| | | | |
|---|---|---|---|
| 3,015,618 | 1/1962 | Stix | 176—3 |
| 3,088,894 | 5/1963 | Koenig | 176—1 |
| 3,171,788 | 3/1965 | Gorman et al. | 176—1 |

References Cited by the Applicant

UNITED STATES PATENTS 2,910,414  10/1959  Spitzer.

OTHER REFERENCES

Controlled Thermonuclear Reactions, by Samuel Glasstone and Ralph H. Lovberg, chapter 8, pp. 290–335.

REUBEN EPSTEIN, *Primary Examiner.*